US011862133B2

(12) United States Patent
Garrison et al.

(10) Patent No.: US 11,862,133 B2
(45) Date of Patent: Jan. 2, 2024

(54) GUITAR MODULATOR STAND

(71) Applicants: Phillip David Garrison, Angier, NC (US); Richard Good, Newton, NC (US); David Kemp, Charlotte, NC (US)

(72) Inventors: Phillip David Garrison, Angier, NC (US); Richard Good, Newton, NC (US); David Kemp, Charlotte, NC (US)

( * ) Notice: Subject to any disclaimer, the term of this patent is extended or adjusted under 35 U.S.C. 154(b) by 123 days.

(21) Appl. No.: 17/498,297

(22) Filed: Oct. 11, 2021

(65) Prior Publication Data

US 2023/0111195 A1    Apr. 13, 2023

(51) Int. Cl.
*G10H 1/32* (2006.01)
*G10D 3/00* (2020.01)
*F16M 13/02* (2006.01)

(52) U.S. Cl.
CPC .............. *G10H 1/32* (2013.01); *F16M 13/02* (2013.01); *G10D 3/00* (2013.01)

(58) Field of Classification Search
CPC ............ F16M 13/02; G10H 1/32; G10H 1/34; G10H 1/348; G10D 3/00
See application file for complete search history.

(56) References Cited

U.S. PATENT DOCUMENTS

| | | | |
|---|---|---|---|
| 6,459,023 B1 | 10/2002 | Chandler | |
| 8,138,406 B2* | 3/2012 | Vinciguerra | G10H 1/348 84/421 |
| 8,614,385 B2* | 12/2013 | McKinney | G10H 1/348 84/453 |
| 9,207,283 B2* | 12/2015 | Partee | H02J 7/0047 |
| 9,520,118 B2* | 12/2016 | Canivell Grifols | G10G 5/00 |
| 9,706,814 B2 | 7/2017 | Converse et al. | |
| 9,947,302 B2* | 4/2018 | Canivell Grifols | G10G 5/00 |
| D832,334 S * | 10/2018 | Kushner | G10G 5/00 D17/20 |
| 10,204,609 B2* | 2/2019 | Canivell Grifols | G10G 5/00 |
| 10,395,631 B1* | 8/2019 | Boxberger | G10H 1/348 |
| D862,578 S * | 10/2019 | Lackner | G10G 5/00 D17/20 |
| 10,565,971 B2* | 2/2020 | Wilfer | G10H 1/34 |
| 10,847,127 B2* | 11/2020 | Stringham | G10G 5/00 |
| 11,107,450 B2* | 8/2021 | Chickneas | H04H 60/04 |
| 11,398,737 B2* | 7/2022 | Dittrich | G04G 19/00 |
| 11,417,301 B2* | 8/2022 | Stanley | G10G 7/00 |
| 11,568,843 B2* | 1/2023 | Morton | G10G 5/00 |

(Continued)

OTHER PUBLICATIONS

"Donner Guitar Effects Pedal Board Set, Waterproof Backpack, including 60" Adhesive Backed Hook-and-loop, with Power Supply Mounting Device," Donnerdeals.com. https://www.donnerdeal.com/products/donner-db-s200-guitar-effects-pedal-board-black-pedalboard-set-waterproof-backpack-bag-including-60-adhesive-backed-hook-and-loop-size-18-11-x-12-76-with-power-supply-mounting-device?variant=37917826613421&currency=USD&utm_medium=product_sync&utm_source=google&utm_content=sag_organic&utm_campaign=sag_organic&gclid=Cj0KCQjw2NyFBhDoARIsAMtHtZ6Rf-t6p0zKXWtKBh0uOweie abxAKT8QN35kWlfynJCJUEtwXfOc6oaAvC5EALw_wcB [Date accessed: Jun. 2, 2021].

(Continued)

*Primary Examiner* — Eret C McNichols
(74) *Attorney, Agent, or Firm* — Bold IP, PLLC

(57) ABSTRACT

One or more embodiments of a device for securing guitar modulators is shown. The device includes a face, a bracket, and a base. The face defines a hole that extends completely through the face with a first length in a first direction and a first width in a second direction perpendicular to the first direction, wherein the first length is greater than the first width. The bracket connects under the face and extends in the first direction parallel to the hole and is configured to allow a grommet to slide along the bracket in the first direction. The base is configured to support the face.

15 Claims, 8 Drawing Sheets

(56) References Cited

U.S. PATENT DOCUMENTS

| | | | | |
|---|---|---|---|---|
| 2004/0250673 | A1* | 12/2004 | Salerno | G10H 1/348 |
| | | | | 84/746 |
| 2007/0295190 | A1 | 12/2007 | Collins | |
| 2014/0131543 | A1* | 5/2014 | Goto | G10H 1/348 |
| | | | | 248/429 |
| 2015/0325224 | A1* | 11/2015 | Mañosa Ripoll | G10G 5/00 |
| | | | | 84/444 |
| 2015/0345694 | A1* | 12/2015 | Bethuy | H04R 1/08 |
| | | | | 248/188.9 |
| 2016/0171959 | A1* | 6/2016 | Canivell Grifols | G10H 1/348 |
| | | | | 84/453 |
| 2017/0047751 | A1* | 2/2017 | Fernandes | H02J 50/10 |
| 2018/0151162 | A1* | 5/2018 | McKenzie | G10H 1/348 |
| 2018/0219392 | A1* | 8/2018 | Dittrich | G04C 10/00 |
| 2022/0208161 | A1* | 6/2022 | Fukuda | G10H 1/348 |

OTHER PUBLICATIONS

"Portable Single Guitar Effects Pedal Board Pedalboard ABS Plastic 50 x 15cm," ebay.com. https://www.ebay.com/itm/163906195458?_trkparms=amclksrc%3DITM%26aid%3D1110006%26algo%3DHOMESPLICE.SIM%26ao%3D1%26asc%3D20200818143230%26meid%3Dcdb2791fd0344be28dd9f3dcdbef9d57%26pid%3D101224%26rk%3D1%26rkt%3D5%26sd%3D202882437776%26itm%3D163906195458%26pmt%3D1%26noa%3D1%26pg%3D2047675%26algv%30DDefaultOrganicWeb%26brand%3DUnbranded&_trksid=p2047675.c101224.m-1 [Dated accessed: Jun. 2, 2021].

\* cited by examiner

GUITAR MODULATOR STAND

FIELD OF THE DISCLOSURE

The present invention relates to devices or stands for securing guitar modulators.

BACKGROUND

Devices for changing the output sound of an electric guitar exist in various forms including modulators, effect pedals, and guitar pedals. These devices are normally activated/deactivated by foot while the hands play the guitar. These devices are often used during a guitar performance to change the sound of the guitar. If several of these modulators are used, it becomes important for the modulators to be laid out in a familiar pattern so the guitarist does not get confused and press the wrong modulator.

Various forms of boards or organizers for these modulators exist. However, they generally have one of two problems. First, the modulators can only be laid out in a few patterns and the board has very little potential for customization. Second, attaching and detaching modulators is a difficult and time-consuming process.

SUMMARY

One or more embodiments are provided below for a device for securing guitar modulators. The device may include a face, a bracket, and a base. The face may define a hole that extends completely through the face with a first length in a first direction and a first width in a second direction perpendicular to the first direction, wherein the first length is greater than the first width. The bracket may connect under the face and extend in the first direction parallel to the hole and be configured to allow a grommet to slide along the bracket in the first direction. The base may be configured to support the face.

The device may provide significant advantages over the devices known in the art. The device may allow for quick and secure connection/disconnection of modulators. The device also allows for easy customization of locations of the modulators on the device. Other advantageous features as well as other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
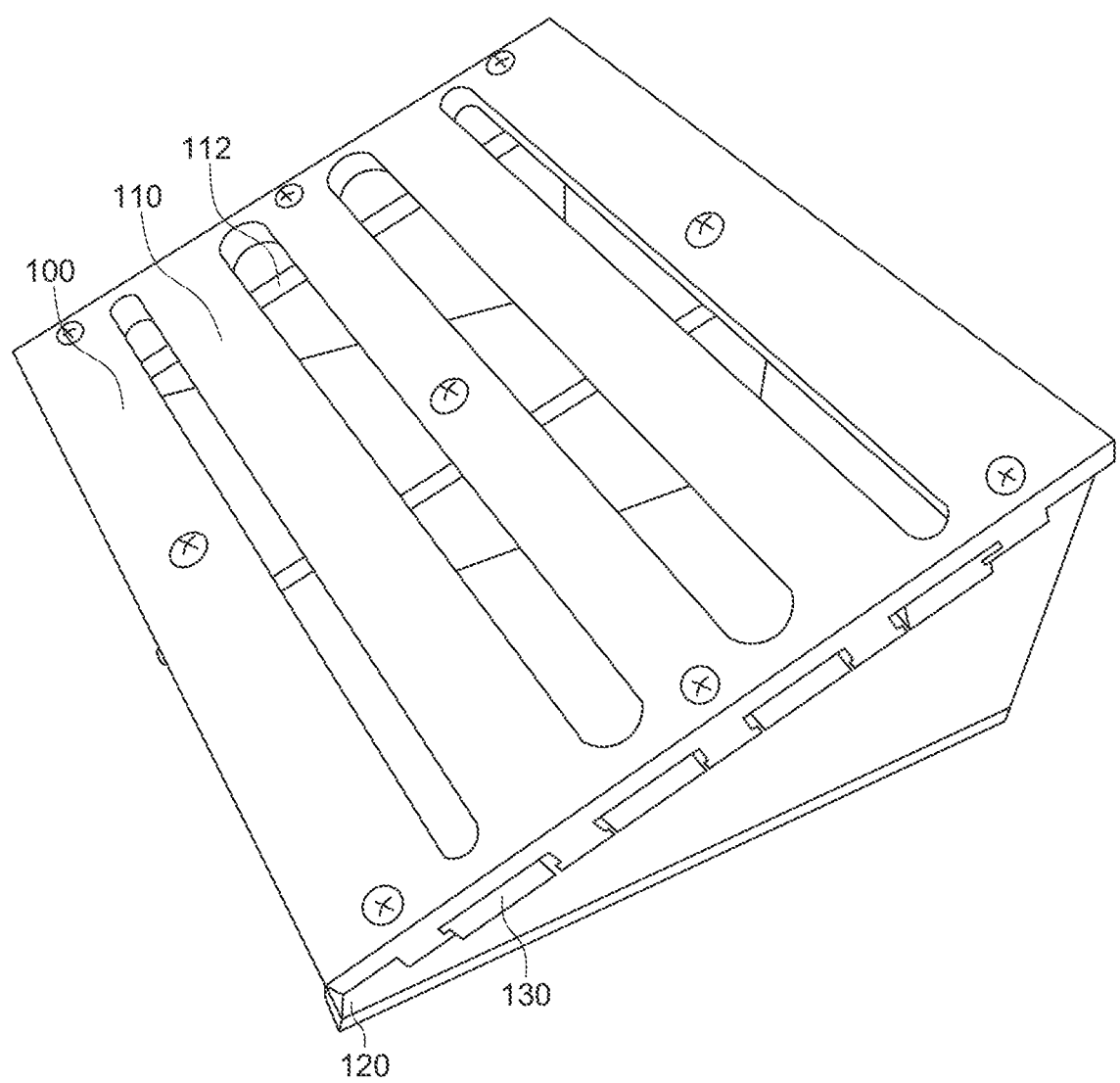
FIG. 1 shows an example top-side view of a stand.

In the Summary above and in this Detailed Description, the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)— (a second number)," this means a range whose lower limit is the first number and whose upper limit is the second number. For example, to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "coupled to" as used herein may mean a direct or indirect connection via one or more components.

Referring now to the drawings and the following written description of the present invention, it will be readily understood by those persons skilled in the art that the present invention is susceptible to broad utility and application. Many embodiments and adaptations of the present invention other than those herein described, as well as many variations, modifications, and equivalent arrangements will be apparent from or reasonably suggested by the present invention and the detailed description thereof, without departing from the substance or scope of the present invention. This disclosure is only illustrative and exemplary of the present invention and is made merely for purposes of providing a full and enabling disclosure of the invention.

FIG. 1 shows an example top-side view of a stand 100. The stand 100 may include a face 110, a bracket 130, and a base 120. The face 110 may be a flat board made of wood, metal, plastic, or other similar durable material. The face 110 may be generally rectangular in shape in a first plane extending in a first direction and a second direction with holes 112 defined through the face 110 in a third direction through the first plane. The holes 112 may have a length in the first direction that extends a majority of the length of the face 110. The holes 112 may have a width in the second direction that is much smaller than the length.

The bracket 130 may extend parallel to the holes in the first direction under the face 110. The bracket 130 may extend on either side of each hole 112. The bracket 130 may include metal, plastic, wood, or other durable materials. The bracket 130 may extend for the entire length of the holes 112.

The base 120 may support the face 110 and may connect to the face 110 on a bottom side of the face 110. The base 120 may include several separate parts. For example, as shown in FIG. 1, the base may include three legs that support the face 110 at an angle (e.g., not parallel to the ground). The base 120 may support the face 110. The base 120 may also support the brackets 130 and any other objects attached to the face 110 and brackets 130. The base 120 may include wood, metal, plastic, or other similar durable materials.

Figure 2:
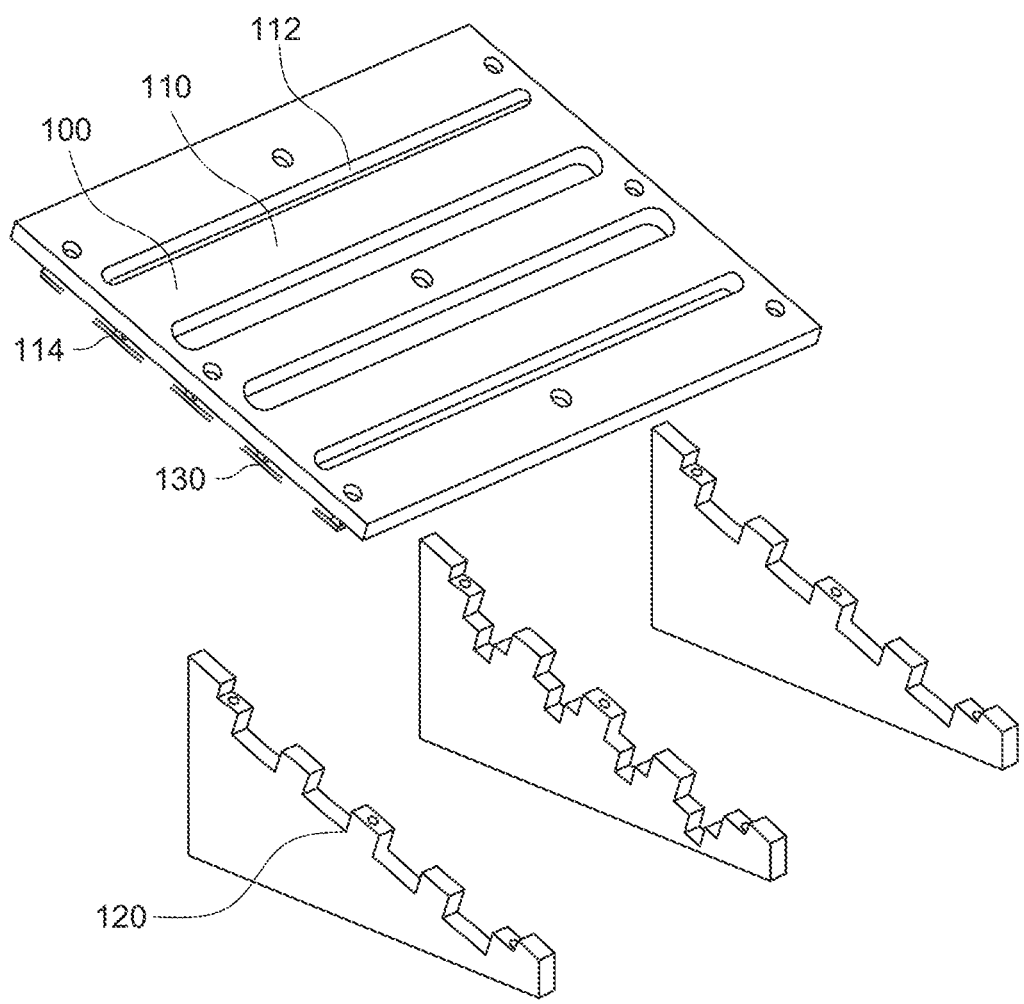
FIG. 2 shows an example exploded view of the stand.

FIG. 2 shows an example exploded view of the stand 100. The stand 100 may include a spacer 114 between the face 110 and the bracket 130. The spacer may be arranged to provide a gap between the bracket 130 and the bottom of the face 110 to create a slot through which a grommet (not shown in this figure) may slide. The spacer 114 may be made of a similar material as the face 110 and bracket 130.

The base 120 may include three legs which extend primarily in parallel in the second direction to support the face 110 at an angle. The legs of the base 120 may define openings arranged to be below the holes 112 so that a portion of the grommet (not shown in this figure) can be slid through the opening between the base and the face 110. The opening in the legs of the base 120 may be arranged to be between fingers of the brackets 130. The middle of the three legs of the base 120 may have additional openings defined in the leg which may allow a peg in the grommet (not shown in this figure) to have room to pass over/through the opening in the leg when the grommet slides in the slot between the bracket 130 and the face 110.

Figure 3:
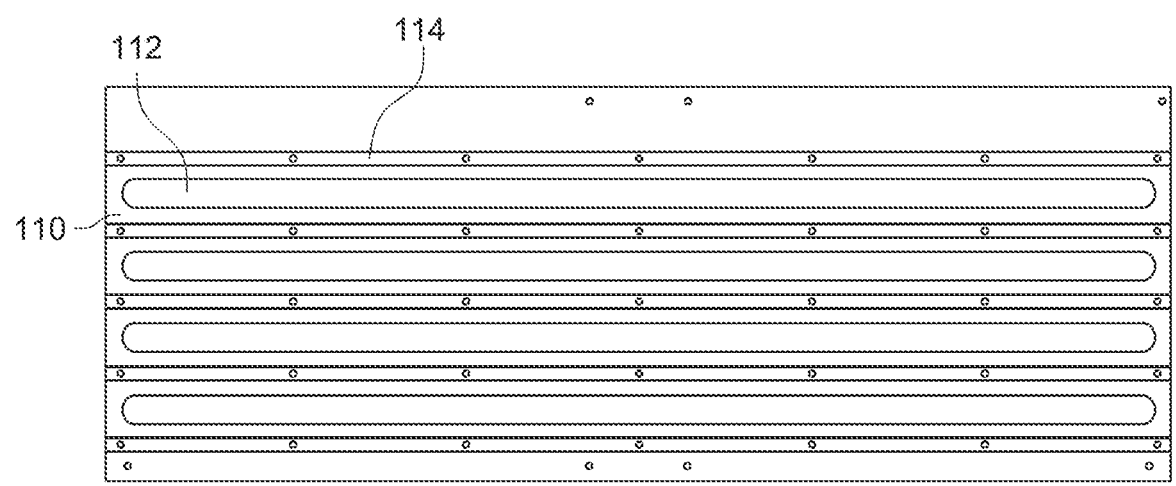
FIG. 3 shows an example bottom view of the face.

FIG. 3 shows an example bottom view of the face 110. The spacers 114 may extend parallel to the holes 112 for all or most of the length of the holes 112. The spacers 114 may be on either side of each of the holes 112.

Figure 4:
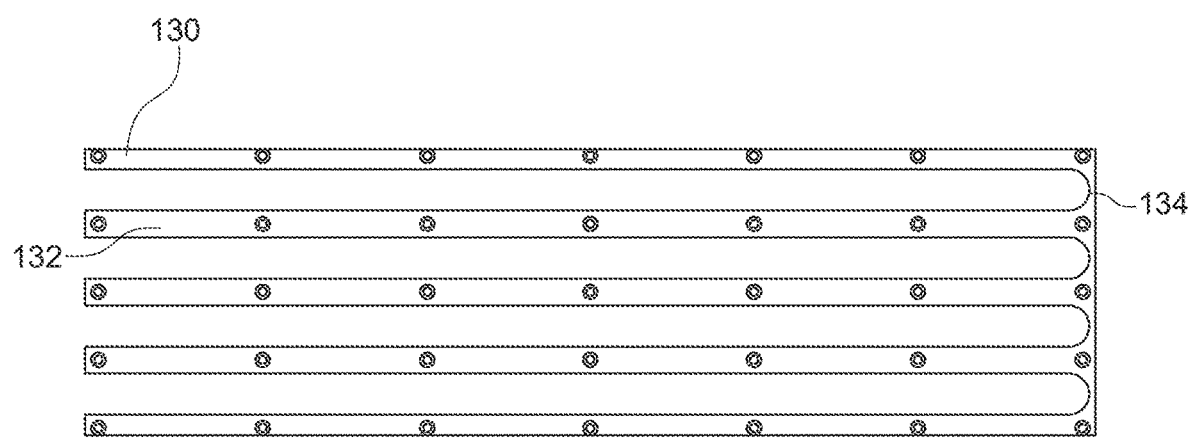
FIG. 4 shows an example bottom view of a bracket.

FIG. 4 shows an example bottom view of the bracket 130. The bracket 130 may include fingers 132 which are arranged to extend on either side of each of the holes 112 under the spacers 114. The bracket 130 may also include a back 134 connecting the fingers 132 and configured to prevent a grommet sliding in the gap between the bracket 130 and the face 110 from sliding out of the gap. Thus, the bracket 130 may be arranged below the holes 112 and on three sides of the holes 112.

Figure 5:
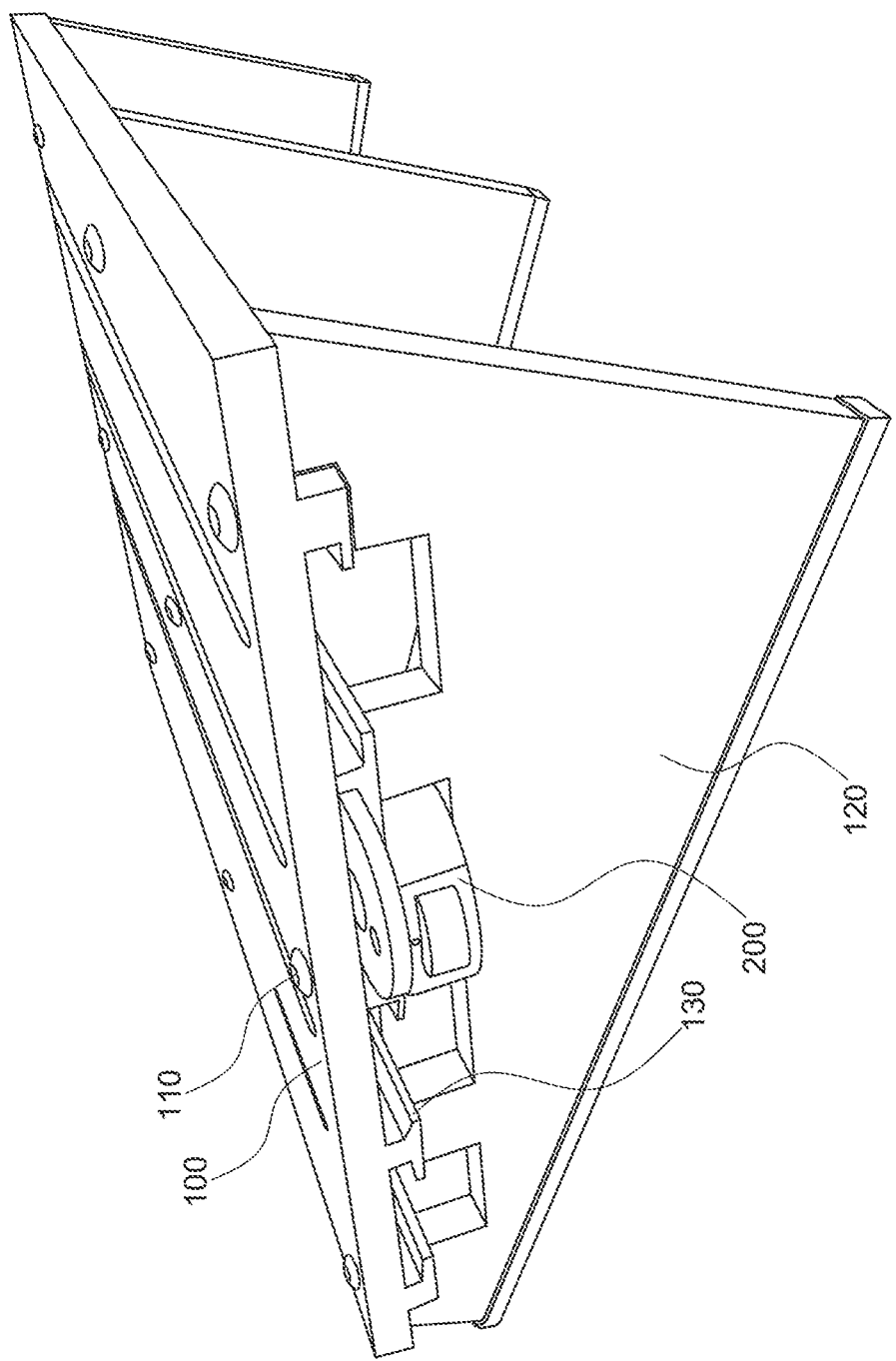
FIG. 5 shows an example side view of the stand.

FIG. 5 shows an example side view of the stand 100 with a grommet 200 shown entering into the slot formed between the bracket 130 and the face 110. The grommet 200 may be shaped and sized such that the grommet 200 may slide through the slot.

Figure 6:
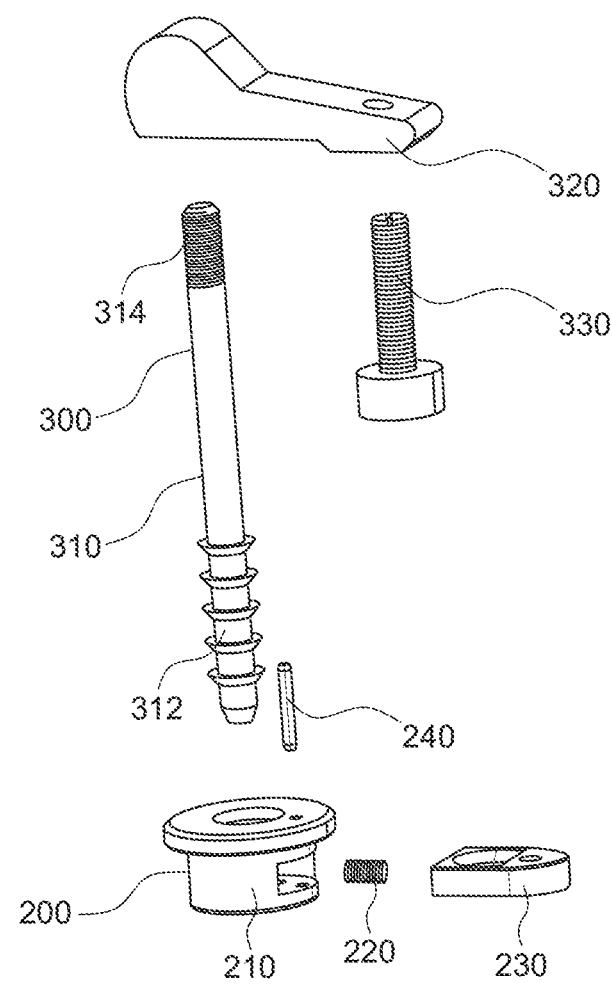
FIG. 6 shows an example exploded view of a grommet and peg.

FIG. 6 shows an example exploded view of a grommet 200 and peg 300. The grommet may include a body 210, a spring 220, a lock 230 and a pin 240. The body 210 may have a generally cylindrical shape with a lip on the top portion of the body 210 shaped and arranged to fit in the gap between the bracket 130 and the face 110. The body may also include an opening for the peg to enter and an opening for the spring 220 and the lock 230 to enter. The spring 220 may be arranged to press the lock 230 in a direction to lock the lock 230 in a position to secure the peg 300 to the grommet 200. The lock 230 and body 210 may be made of plastic or another durable material. The lock 230 may be configured to slide into the opening for the lock 230 and engage with the peg 300 to secure the peg 300 to the grommet 200. The pin 240 may be arranged in the opening in the body 210 to prevent the lock 230 from completely exiting the opening in the body 230. The pin 240 may be made of metal or another durable material.

The peg 300 may include a shaft 310, head 320, and a bumper 330. The shaft 310 may include notches or extensions 312 for engaging with the lock 230 of the grommet 200 to secure the shaft in the opening in the body 210 of the grommet 200 when the lock is engaged with the shaft 310. The lock 230 may be disengaged with the shaft 310 by pressing on the lock 230. The shaft 310 may be sized such that the shaft 310 can fit through the hole 112 in the face 110. The shaft 310 may also include a connection end 314 with threading or other mechanism for connecting the connection end 314 with the head 320. The shaft 310 may include metal, plastic, and other durable materials.

The head 320 may connect to the connection end 314 of the shaft 310 and extend horizontally and connect to the bumper 330. The bumper 330 may have threading or another mechanism to connect to the head and may include a material such as silicone or rubber with high friction that may contact a modulator or other device that is desired to be secured to the face 110 of the stand 100. The bumper may also be adjustable in height below the head 320 by rotating the bumper 330 relative to the head 320 on the threads.

Figure 7:
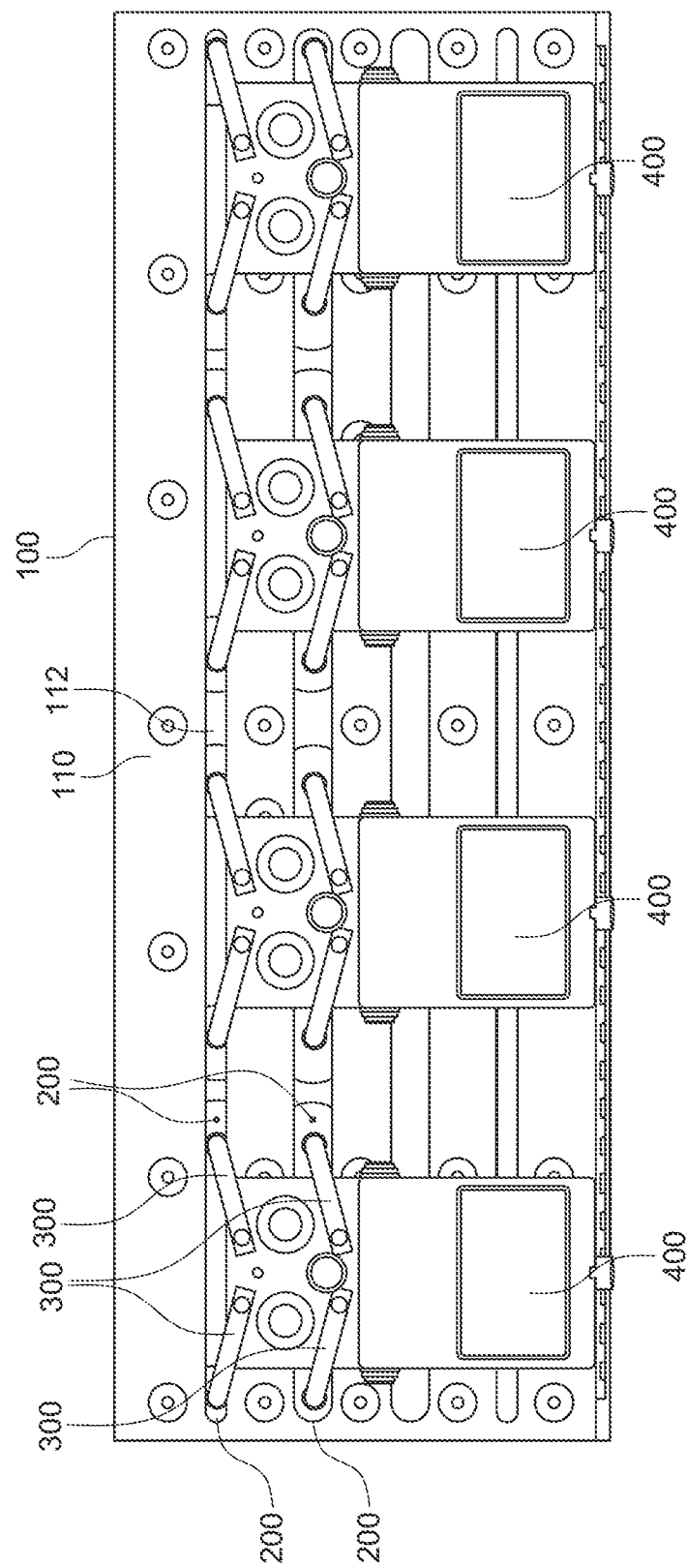
FIG. 7 shows an example top view of the stand with modulators attached.

FIG. 7 shows an example top view of the stand 100 with modulators 400 attached.

The stand 100 may have several grommets 200 in the slots below the face 100 with pegs 300 extending through the holes 112 in the face into the grommets 200. The pegs 300 may each be attached to one of the grommets 200. Multiple pegs 300 and grommets 200 may be used to attach each modulator 400 to the face 110. Objects other than modulators 400 may also be attached to the face 110 using the grommets 200 and pegs 300. The grommets 200 may be slid in the slots under each hole 112 so that the grommets 200 may be positioned to secure (using the pegs 300) each modulator 400 (or other device) in a desired position.

Figure 8:
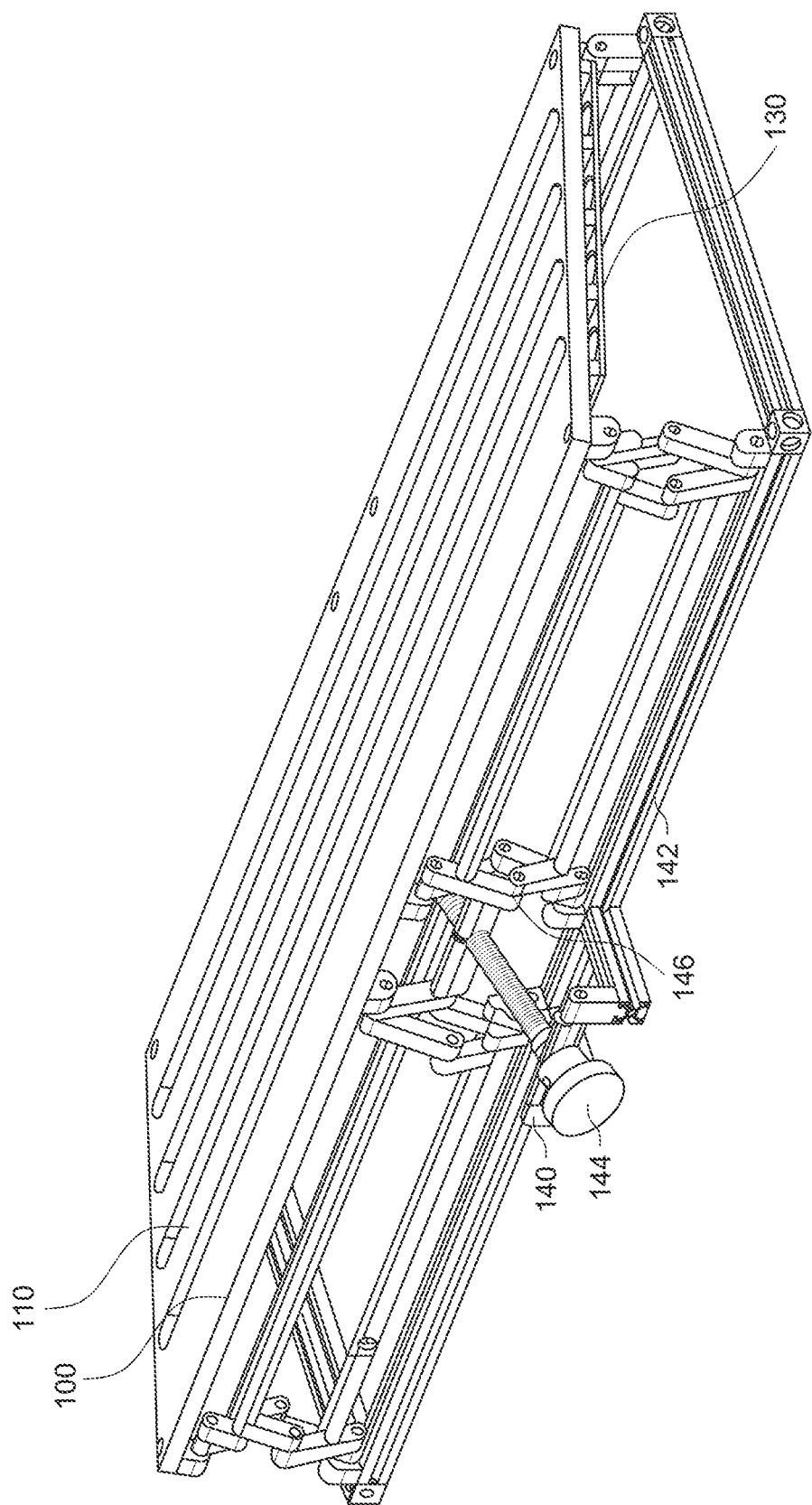
FIG. 8 shows an example back view of a second embodiment of the stand.

FIG. 8 shows an example back view of a second embodiment of the stand 100. The stand 100 may include a height adjustable base 140. The height adjustable base 140 may include a foot 142, adjustment screw 144, and scissoring legs 146. The foot 142 may be a frame or other form of structure that supports the stand and does not adjust in shape. The scissoring legs 146 may change or adjust in shape in a scissoring motion to adjust a height of a portion of the face 110 (e.g., lift the back end of the face 110) or adjust the angle of the face 110 (e.g., adjust the angle of the face 110 relative to the foot 142 and the ground. The scissoring legs 146 may also lay flat causing the overall height of the stand 100 to be decreased and making transportation easier. The adjustment screw 144 may be attached between the foot 142 and the scissoring legs 146 such that when the adjustment screw 144 is turned, the scissoring legs adjust in shape to adjust the height and/or angle of the face 110. Other ways of making the height adjustable base 140 may include, using pistons, gears, electronic actuators, etc. to cause the scissoring legs 146 to change shape. Furthermore, the scissoring legs could be replaced by various other forms of height adjustable legs. The foot 142 and scissoring legs 146 may be made of similar materials as the face 110 and bracket 130. The adjustment screw 144 may include metal or another durable material.

Many different embodiments of the inventive concepts have been shown. A person of ordinary skill in the art will appreciate that the features from different embodiments may be combined or replaced with other features from different embodiments.

Advantageously, the stand 100 may allow for quick and secure connection/disconnection of modulators due to the ease of sliding a grommet 200 into a slot and then pressing a peg 300 into the grommet 200 through the hole 112 in the face 110. The stand 100 also allows for easy customization of locations of the modulators 400 on the stand due to the ease of moving the grommets 200 in the slots, allowing a user to secure modulators 400 (or other devices) anywhere on the face where a peg 300 attached to a grommet 200 can reach the modulator 400.

In one embodiment the device may include a face 110, a bracket 130 and a base 120. The face 110 may define a hole 112 that extends completely through the face 110 with a first length in a first direction and a first width in a second direction perpendicular to the first direction, wherein the first length is greater than the first width. The bracket 130 may connect under the face 110 and extend in the first direction parallel to the hole 112 and be configured to allow a grommet 200 to slide along the bracket 130 in the first direction. The base may be configured to support the face. The bracket 130 may be arranged between the base 120 and the face 110. The bracket 130 may include a first rail (e.g., first finger 132 of the bracket 130) below the hole in the second direction and a second rail (e.g., second finger 132 of the bracket 130) above the hole in the second direction. The base 120 may define an indent for the grommet 200 to slide through while sliding along the bracket 130. The device may further include the grommet 200 sized and configured to slide along the bracket 130 in the first direction. The grommet 200 may include an opening and a releasable locking mechanism (e.g., lock 230 and spring 220). The device may further include a peg 300 configured to enter into the opening in the grommet 200 and be releasably locked into the opening by the locking mechanism. The peg 300 may be shaped and configured to secure an object (e.g., modulator 400) to the face 100 when the grommet 200 is in a slot defined by the bracket 130 and the face 110 and the peg 300 is inserted through the hole 112 in the face 110. The bracket 130 and the grommet 200 may be sized and arranged for a plurality of grommets 200 including the grommet 200 to be inserted into the slot.

The device may further include a plurality of holes 112 including the hole 112 and a plurality of brackets (e.g., fingers 132 of the bracket) including the bracket 130. Each of the plurality of brackets may be arranged under the face and extend in the first direction parallel to a respective one of the plurality of holes 112 and be configured to allow the grommet 200 to slide along the bracket in the first direction.

The base 140 may include a lifting mechanism (e.g., foot 142, scissoring arms 146, and adjustment screw 144) configured to adjust an angle of the face 110. The base 140 may include a lifting mechanism configured to adjust a height of a portion of the face 110. The lifting mechanism may include scissoring arms 146 and an adjustment screw 144 configured to move the scissoring arms 146 when the adjustment screw 144 is rotated in order to adjust the height of the portion of the face 110.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed.

Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A device comprising:
    a face defining a hole that extends completely through the face with a first length in a first direction and a first width in a second direction perpendicular to the first direction, wherein the first length is greater than the first width;
    a bracket connected under the face and extending in the first direction parallel to the hole and configured to allow a grommet to slide along the bracket in the first direction; and
    a base configured to support the face, wherein the base defines an indent for the grommet to slide though while sliding along the bracket.

2. The device of claim 1, wherein the bracket is arranged between the base and the face.

3. The device of claim 1, wherein the bracket includes a first bracket below the hole in the first direction and a second bracket above the hole in the first direction.

4. The device of claim 1, further comprising:
    the grommet sized and configured to slide along the bracket in the first direction, the grommet including an opening and a releasable locking mechanism,
    a peg configured to enter into the opening in the grommet and be releasably locked into the opening by the releasable locking mechanism, wherein the peg is shaped and configured to secure an object to the face when the grommet is in a slot defined by the bracket and the face and the peg is inserted through the hole in the face.

5. The device of claim 4, wherein the bracket and the grommet are sized and arranged for a plurality of grommets including the grommet to be inserted into the slot.

6. The device of claim 5, further comprising:
    a plurality of holes including the hole; and
    a plurality of brackets including the bracket, wherein each of the plurality of brackets is arranged under the face and extending in the first direction parallel to a respective one of the of the plurality of holes and is configured to allow the grommet to slide along the bracket in the first direction.

7. A device comprising:
a face defining a hole that extends completely through the face with a first length in a first direction and a first width in a second direction perpendicular to the first direction, wherein the first length is greater than the first width;
a bracket connected under the face and extending in the first direction parallel to the hole;
a grommet sized and configured to slide along the bracket in the first direction, the grommet including an opening and a releasable locking mechanism; and
a peg configured to enter into the opening in the grommet and be releasably locked into the opening by the releasable locking mechanism, wherein the peg is shaped and configured to secure an object to the face when the grommet is in a slot defined by the bracket and the face and the peg is inserted through the hole in the face.

8. The device of claim 7, further comprising:
a base configured to support the face.

9. The device of claim 8, wherein the bracket is arranged between the base and the face.

10. The device of claim 8, wherein the bracket includes a first rail below the hole in the second direction and a second rail above the hole in the second direction.

11. The device of claim 8, wherein the base defines an indent for the grommet to slide through while sliding along the bracket.

12. The device of claim 8, wherein the bracket and the grommet are sized and arranged for a plurality of grommets including the grommet to be inserted into the slot.

13. The device of claim 12, further comprising:
a plurality of holes including the hole; and
a plurality of brackets including the bracket, wherein each of the plurality of brackets is arranged under the face and extending in the first direction parallel to a respective one of the of the plurality of holes and is configured to allow the grommet to slide along the bracket in the first direction.

14. The device of claim 8, wherein the base includes a lifting mechanism configured to adjust an angle of the face.

15. The device of claim 8, wherein the base includes a lifting mechanism configured to adjust a height of a portion of the face.

* * * * *